Nov. 13, 1934.  G. M. WALKER  1,980,562
PLANTING IMPLEMENT
Filed July 5, 1933    2 Sheets-Sheet 1

Inventor
G. M. WALKER
By 
Attorney

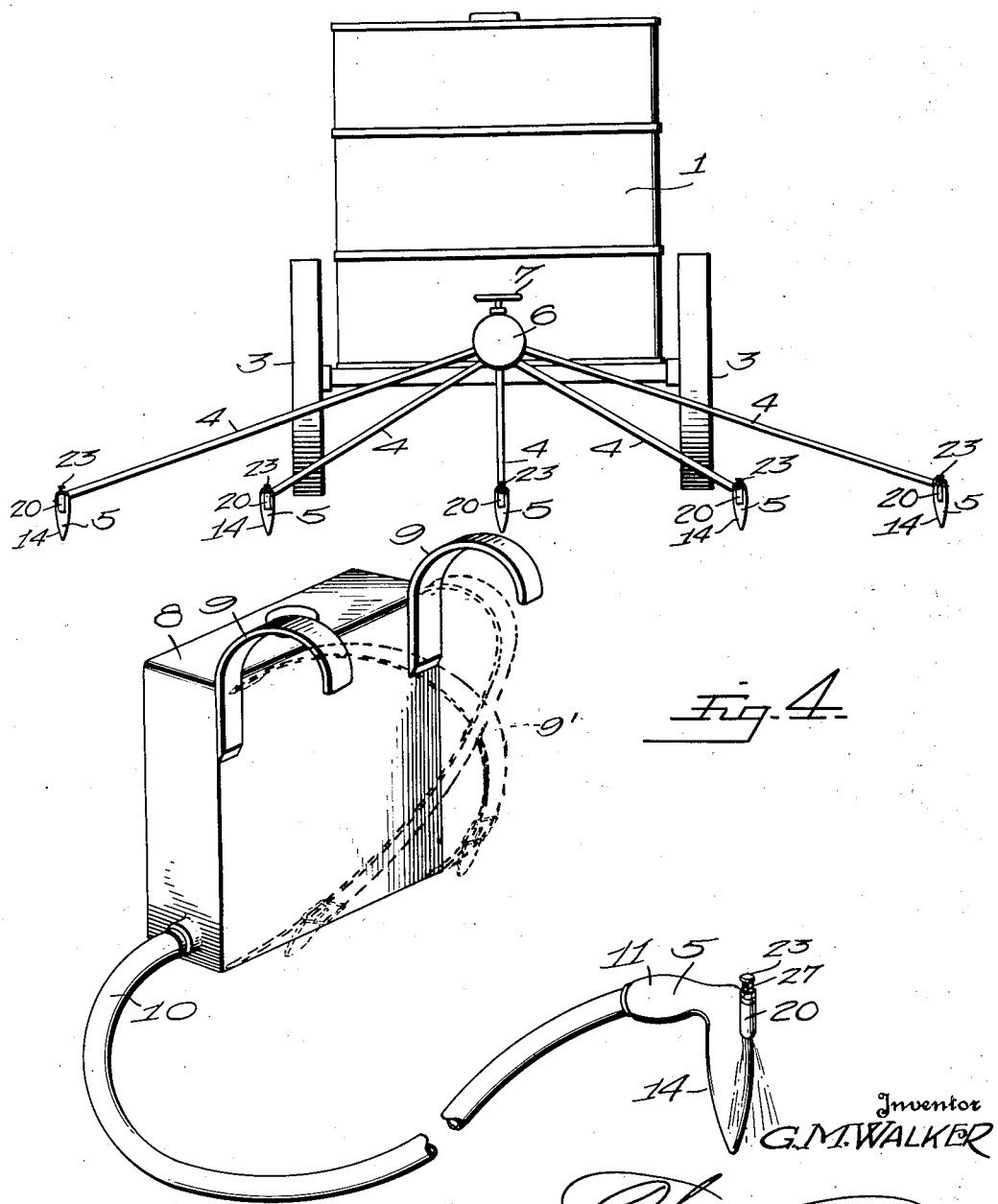

Patented Nov. 13, 1934

1,980,562

UNITED STATES PATENT OFFICE 1,980,562

PLANTING IMPLEMENT

George M. Walker, Nashville, Tenn., assignor to M. Daniel Johnson, Nashville, Tenn.

Application July 5, 1933, Serial No. 679,115

2 Claims. (Cl. 111—6)

My invention relates to improvements in planting implements, which is particularly designed and adapted for the planting of tobacco plants, but is not limited to such use, but may be used for planting any character of plants where it would perform its functions in a satisfactory manner.

One object of my invention is the provision of an implement of the character and for the purpose stated which may be drawn over the ground and plant a series of rows of plants, or which may be carried upon the person of the user and operate to plant a single row of plants and which will operate in a most satisfactory manner under both conditions.

Another object of my invention is the provision of a planting implement which will prove a great saver of time and labor in that the implement will make the hole to receive the plant and when the plant is set will by manual control and operation supply a desired amount of water to the plant.

Another object of my invention is the production of a planting implement which will be capable of use in planting or setting a single row or a series of rows of plants and which can be operated in either instance by a single attendant and thus greatly increase the capacity of work accomplished by the implement.

Another object of my invention is the provision of a planting implement which will quickly effect the planting and watering of the plant, which will be simple, strong and durable in construction and capable of being sold at a low price to make its use highly desirable and practical.

With these objects in view my invention consists of a planting implement of the character and for the purposes stated embodying novel features of construction and combination of parts, substantially as described and claimed and as shown in the accompanying drawings, in which:

Figure 3 represents a rear elevation of a modified form of my planting implement in which the water supply pipes all lead from a single outlet, and Figure 4 represents a perspective view of the form of my implement which is carried upon the back of the person and used for planting a single row of plants.

Referring by numeral to the drawings in which the same numbers of reference are employed to denote like parts in the four views:

Figure 1:
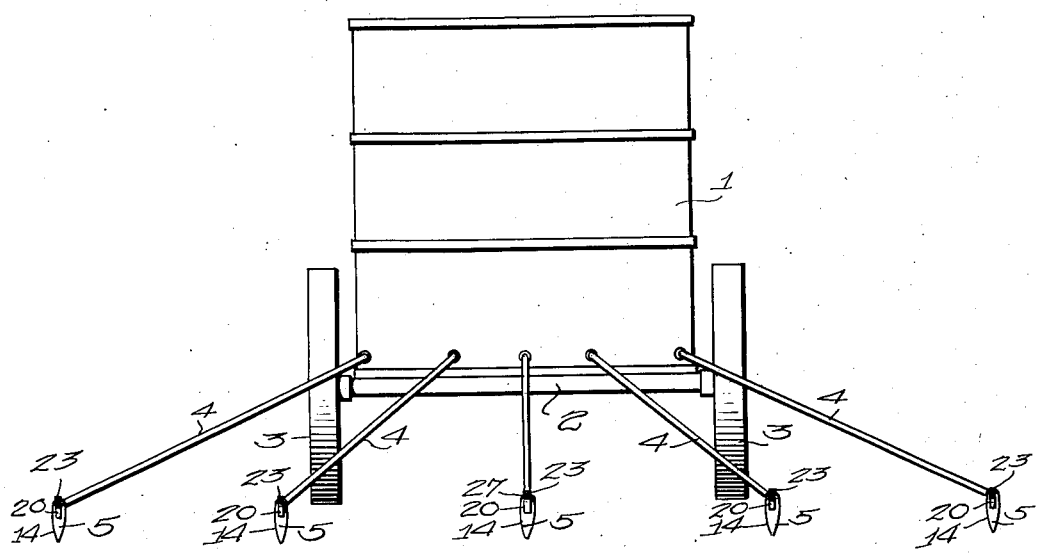
Figure 1 represents a rear elevation of a planting implement constructed in accordance with and embodying my invention, of the character used in planting a series of rows of plants.
Figure 1:
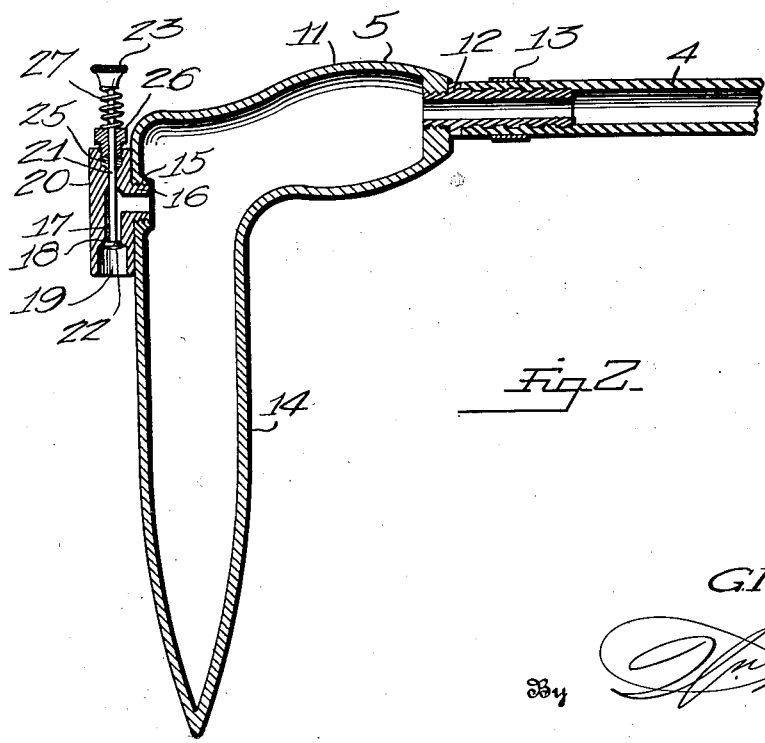

The numeral 1 designates a tank or container for water of the desired capacity and mounted on an axle 2, supplied with ground wheels 3, and this form of my invention is drawn over the ground and has leading from the rear lower portion of the tank the series of pipes or hose 4, which are properly spaced at an incline to locate the planting pins 5, at the rows to be planted this form being shown in Figure 1, while in the form shown in Figure 3, the single outlet 6, having a control valve 7, is used.

In the form of my invention shown in Figure 4 and which is carried by the person, a tank or container 8, having shoulder embracing loops 9, or adjustable straps 9', and a single pipe or hose 10, leading to the planting pin 5, is used.

From the foregoing description taken in connection with the drawings it will be apparent when desired to plant or set a series of rows of plants that the machine or implement is drawn over the ground and the water flows from the container into the hollow tapered shape pin 5, that the attendant drives the pin into the ground to make the hole to receive the plant, then places the plant in the hole and when this is accomplished the water is supplied to the plant. In the individual planting implement shown in Figure 4, which is carried upon the back of the person and hung by the loops from the shoulders the operation is the same as in the form used for planting a series of rows.

Figure 2:
Figure 2 represents a central longitudinal sectional view of the pin forming a most essential feature of my invention for which to illustrate more clearly is shown on an enlarged scale.

The most important part or feature of my invention is the pin shown in Figure 2, and this is right angled in general outline and comprises the grasping portion 11, which receives the coupling sleeve 12, secured by the collar 13, to the pipe or hose, and the vertical tapered portion 14, of the pin is provided near its upper portion with a threaded opening 15, which receives the threaded nipple 16, leading to the vertical passage 17, having the valve seat 18, and the discharge nozzle 19, and guided in the member 20, which has the said passage, valve seat and nozzle is the rod 21, carrying at one end the valve 22 and at its upper end the head or press button 23.

It will thus be seen from Figure 2 that the valve carrying member is located at the upper forward portion of the pin and within easy reach of the finger to allow the user to apply pressure to the button 23, to move the valve away from its seat and allow the water to flow downward through the nozzle to the hole in which the plant has been set or placed, and the said rod 21, is guided in the passage 24 of the valve casing or member, through the stuffing box 25, and the packing 26, and such valve is held normally closed by the coiled spring 27, which exerts its tension against the button and stuffing box and holds the valve closed under normal conditions.

The many features of merit which this invention possesses will be readily understood by all persons skilled in the planting of tobacco and other plants, and it will commend itself as desirable and practical either for planting a single or a series of rows and effecting a great saving of time, labor and money.

In the forms of my invention shown in Figures 1 and 3 it will be noted that the pipes of rigid material as shown, lead from the tank and in an inclined series to the planting pins and this is of great importance as this construction disposes the pins in a series of rows so that the single attendant can manipulate the pins to make the opening for the plant and then discharge the water to the plants and openings in a rapid and efficient manner.

It will also be noted that the valve mounting of my invention is a separate member or unit from the pin and can be applied or detached when desired and also the tension of the valve spring may be adjusted and the parts of the valve adjusted perfectly or removed for purpose of repair or replacement.

I claim:

1. A planting implement of the character and for the purpose described in which liquid is conducted from a tank to a setting pin, said pin having a grasping portion, a tapered pin portion, a vertically disposed valve mounting having a nipple formed with threads to engage a threaded opening in the upper outer portion of said pin and in communication therewith, a nozzle and valve seat in said valve mounting, and a spring controlled valve in said valve mounting.

2. A planting implement of the character and for the purpose described in which liquid is conducted from a tank to a setting pin, said pin having a grasping portion, a tapered pin portion having a water outlet, a vertically disposed valve mounting having an inlet nipple communicating with the outlet opening of the pin, a nozzle and valve seat in said valve mounting, a valve fitting said seat, a vertical valve stem passing upward from the valve and through the mounting, and a spring around said stem for controlling said valve.

GEORGE M. WALKER.